United States Patent
Sumrell et al.

(10) Patent No.: US 10,369,481 B2
(45) Date of Patent: Aug. 6, 2019

(54) INCLUSIVE PLAY PANELS AND PLAYGROUND STRUCTURES COMPRISING THE PANELS

(71) Applicant: PlayCore Wisconsin, Inc., Chattanooga, TN (US)

(72) Inventors: Jennie Newman Sumrell, Hixson, TN (US); Lisa Moore, Chattanooga, TN (US); Samuel Grady Smith, Fort Payne, AL (US); Thomas Robert Norquist, Fort Payne, AL (US)

(73) Assignee: PLAYCORE WISCONSIN, INC., Chattanooga, TN (US)

( * ) Notice: Subject to any disclaimer, the term of this patent is extended or adjusted under 35 U.S.C. 154(b) by 148 days.

(21) Appl. No.: 15/691,212

(22) Filed: Aug. 30, 2017

(65) Prior Publication Data
US 2018/0093194 A1   Apr. 5, 2018

Related U.S. Application Data

(60) Provisional application No. 62/404,629, filed on Oct. 5, 2016.

(51) Int. Cl.
| | |
|---|---|
| *A63B 9/00* | (2006.01) |
| *A63B 24/00* | (2006.01) |
| *A63B 71/06* | (2006.01) |
| *A63G 21/00* | (2006.01) |
| *A63G 21/10* | (2006.01) |
| *A63G 31/00* | (2006.01) |
| *G06F 3/0488* | (2013.01) |

(52) U.S. Cl.
CPC ............... *A63G 31/00* (2013.01); *A63B 9/00* (2013.01); *A63B 24/0087* (2013.01); *A63B 71/0622* (2013.01); *A63G 21/00* (2013.01); *A63G 21/10* (2013.01); *G06F 3/0488* (2013.01); *A63B 2009/006* (2013.01); *A63B 2071/0625* (2013.01); *A63B 2071/0655* (2013.01); *A63B 2208/12* (2013.01); *A63B 2225/09* (2013.01)

(58) Field of Classification Search
CPC ........ A63B 9/00; A63B 2009/006–008; A63G 31/00
See application file for complete search history.

(56) References Cited

U.S. PATENT DOCUMENTS

| | | | | |
|---|---|---|---|---|
| 2009/0197740 | A1* | 8/2009 | Julskjaer ................. | A63B 9/00 482/35 |
| 2012/0142441 | A1* | 6/2012 | King ...................... | A63G 31/00 472/136 |
| 2015/0118670 | A1* | 4/2015 | Jespersen ................ | G09B 5/06 434/319 |

* cited by examiner

*Primary Examiner* — Jennifer M Deichl
(74) *Attorney, Agent, or Firm* — McAndrews, Held & Malloy, Ltd.

(57) ABSTRACT

Embodiments of the present disclosure are directed to play panels, and playground structures comprising such panels, that provide an interactive play activity for children. The play panels comprise at least a surface that is configured to provide an interactive element, a control unit, and a connection element configured to communicatively link an adaptive switch. A child may interact directly with one or more elements on the surface of the play panel to actuate the play activity. A child having a disability may also actuate the play activity using an adaptive switch that is communicatively connected to the play panel. In some embodiments, the control unit may be configured to operate the play activity differently depending on whether it is actuated by elements on the surface of the play panel or a connected adaptive switch.

20 Claims, 7 Drawing Sheets

INCLUSIVE PLAY PANELS AND PLAYGROUND STRUCTURES COMPRISING THE PANELS

This application claims priority to U.S. Provisional Patent Application No. 62/404,629, filed on Oct. 5, 2016, the entirety of which is incorporated by reference herein.

BACKGROUND OF THE INVENTION

Play panels allow for the design of a playground that has a variety of play opportunities. Unfortunately, many of the play opportunities provided by play panels are not accessible to children with disabilities. The play panels of the present invention are configured to provide play opportunities that are interesting and enjoyable to children both with and without disabilities. Incorporation of the play panels of the present invention into playground structures provides for playgrounds having new and varied inclusive-play opportunities.

SUMMARY OF THE INVENTION

Embodiments of the present disclosure are directed to play panels that provide an interactive play activity for a child. The play panel comprises at least a surface that comprises one or more interactive elements, a control unit, and a connection element configured to communicatively link the play panel with an adaptive switch. The control unit (which may also be referred to as a processing unit, a processor, or the like) is configured to operate the play activity, which may involve for example producing sounds and/or images, activating lights, causing one or more elements on the surface to move, and the like. The control unit may be caused to operate the play activity in response to both a child interacting with the one or more interactive elements on the surface of the play panel and a child activating an adaptive switch that is connected to the play panel. In this way, the play activity may be interacted with and enjoyed by all children, including those with disabilities.

In some embodiments, the control unit may be configured to operate in at least a first mode and a second mode. Operation of the play activity in the first mode may be caused by a child interacting with the one or more interactive elements, for example one or more sensors that detect a child's touch, on the surface of the play panel. Operation of the play activity in the second mode may be caused by a child interacting with an adaptive switch that is connected to the play panel.

In some embodiments, the play activity when operated in the second mode may differ from the play activity when operated in the first mode. For instance, during operation in the first mode, the play panel may provide an interesting, enjoyable, and optionally challenging play activity tailored for a child without disability. During operation in the second mode, the play panel may be interactive with the adaptive switch so as to provide an interesting, enjoyable, and optionally challenging play activity tailored for a child with a disability. In other embodiments, the play activity when operated in the second mode may be substantially similar to, or the same as, the play activity when operated in the first mode.

In some embodiments, the control unit may be configured so that operation in the first mode is at least temporarily unavailable during operation in the second mode. For instance, in some embodiments, once an adaptive switch is connected to the play panel, the interactive elements on the surface of the play panel may still be used to actuate the play activity. However, once the control unit has begun operation in the second mode, a child may temporarily be prevented from actuating the control unit in the first mode. For instance, once an adaptive switch has been activated in order to actuate the play activity, the control panel may lock out signals from the one or more interactive elements on the surface of the play panel. In other embodiments, operation in the first mode may be made unavailable (e.g. the control unit may lock out signals from the one or more interactive elements on the surface of the play panel) as soon as an adaptive switch is connected with the play panel. In this way, the control unit may be configured to limit operation of the play activity to the second mode when an adaptive switch is connected to the play panel.

In some embodiments, an adaptive switch port may be located on the surface of the play panel that comprises the one or more interactive elements. For instance, in some embodiments, the adaptive switch port may be clearly identified on the surface so that a caretaker of a child with a disability will be able to immediately identify that the play panel has adaptive switch compatibility. The adaptive switch port may be configured to operate with any type of adaptive switch plug, including for example both mono and stereo adaptive switch plugs.

Embodiments of the multi-operation play panels may provide a variety of play activities that stimulate the senses, including for example, auditory play activities, visual play activities, tactile or physical play activities, video play activities, and combinations thereof. These activities may be selected and configured to provide both a child having a disability and a child without disability with an array of developmental benefits.

In some embodiments, the play panel may comprise an auditory play activity. For instance, the play panel may comprise one or more speakers. The play panel may be configured so that a child may touch one or more interactive elements, e.g. touch sensors such as buttons or the like, on the surface of the play panel in order to trigger the control unit to emit one or more sounds over the speaker(s). The play panel may also be configured so that a child may trigger the control unit to emit one or more sounds over the speaker(s) by activating the adaptive switch. The sounds emitted when the adaptive switch is activated (e.g. during operation of the control panel in the second mode) may be the same as, or different from, the sounds emitted when the one or more interactive elements on the surface of the play panel are activated (e.g. during operation of the control panel in the first mode).

In some embodiments, the play panel may comprise a visual play activity. For instance, the play panel may comprise one or more lights on the play surface. The play panel may be configured so that a child may touch one or more interactive elements, e.g. touch sensors such as buttons or the like, on the surface of the play panel in order to trigger the control unit to illuminate the light(s). The play panel may also be configured so that a child may trigger the control unit to illuminate the light(s) by activating the adaptive switch. The illumination of the light(s) that occurs when the adaptive switch is activated (e.g. during operation of the control panel in the second mode) may be the same as, or different from, the illumination of the light(s) that occurs when the one or more interactive elements on the surface of the play panel are activated (e.g. during operation in the first mode).

In some embodiments, the play panel may comprise a physical play activity. For instance, the play panel may comprise one or more elements that are movable about the surface of the play panel. The play panel may be configured so that a child may (i) physically manipulate the element(s) and/or (ii) touch one or more interactive elements, e.g. touch sensors such as buttons or the like, on the surface of the play panel in order to trigger the control unit to initiate a motor that manipulates the element(s). The play panel may also be configured so that a child may trigger the control unit to manipulate the element(s) by activating the adaptive switch. The manipulation of the element(s) that occurs when the adaptive switch is activated (e.g. during operation of the control unit in the second mode) may be the same as, or different from, the manipulation of the element(s) that occurs when the one or more interactive elements on the surface of the play panel are activated (e.g. during operation of the control unit in the first mode).

In some embodiments, the play panel may comprise a video play activity. For instance, the play panel may comprise one or more video screens on the surface of the play panel. The play panel may be configured so that a child may touch one or more interactive elements on the surface of the play panel, e.g. touch sensors or a video screen equipped with a touchscreen, in order to trigger the control unit to play content on the video screen(s), alter/change the content being played on the video screen, or the like. The play panel may also be configured so that a child may trigger the control unit to play content on the video screen(s), alter/change the content being played on the video screen, or the like, by activating an adaptive switch. The video content that is played when the adaptive switch is activated (e.g. during operation in the second mode) may be the same as, or different from, the video content that is played when the one or more interactive elements on the surface of the play panel are activated (e.g. during operation in the first mode).

Embodiments of the present disclosure are also directed to playground structures comprising the multi-operation play panels described herein. In some embodiments, for example, the multi-operation play panels may be incorporated into a variety of playground structures to increase the play opportunities provided by the structures. For example, the multi-operation play panels may be incorporated onto the interior and/or the exterior of climber units, ramps, bridges, and the like. In some embodiments, the climber unit, ramp, bridge, or the like may be configured to allow a child standing on the structure to utilize the play panel at the same time that a child in a mobility device may utilize the play panel from the ground, providing beneficial cooperative play opportunities. Further, in some embodiments, the climber unit, ramp, bridge, or the like may be configured to allow a child in a mobility device to easily reach the play surface, such as by providing the play panel at an easily reachable height and/or by providing open space that may accept a portion of a mobility device beneath the panel.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Embodiments of the present disclosure are directed to a play panel 10 that is designed to provide play opportunities to children with disabilities as well as children without disabilities. For purposes of the present disclosure, children with disabilities refers to children that are physically and/or functionally unable access their environment, such as to interact with a play panel 10, in the same way as other children, i.e., children without disability. This may include, for example, children with physical disabilities, children with limited upper body function, children with limited motor control, children with cognitive impairment, children with developmental disabilities (e.g. autism, Down syndrome, etc.), and the like.

Figure 1:
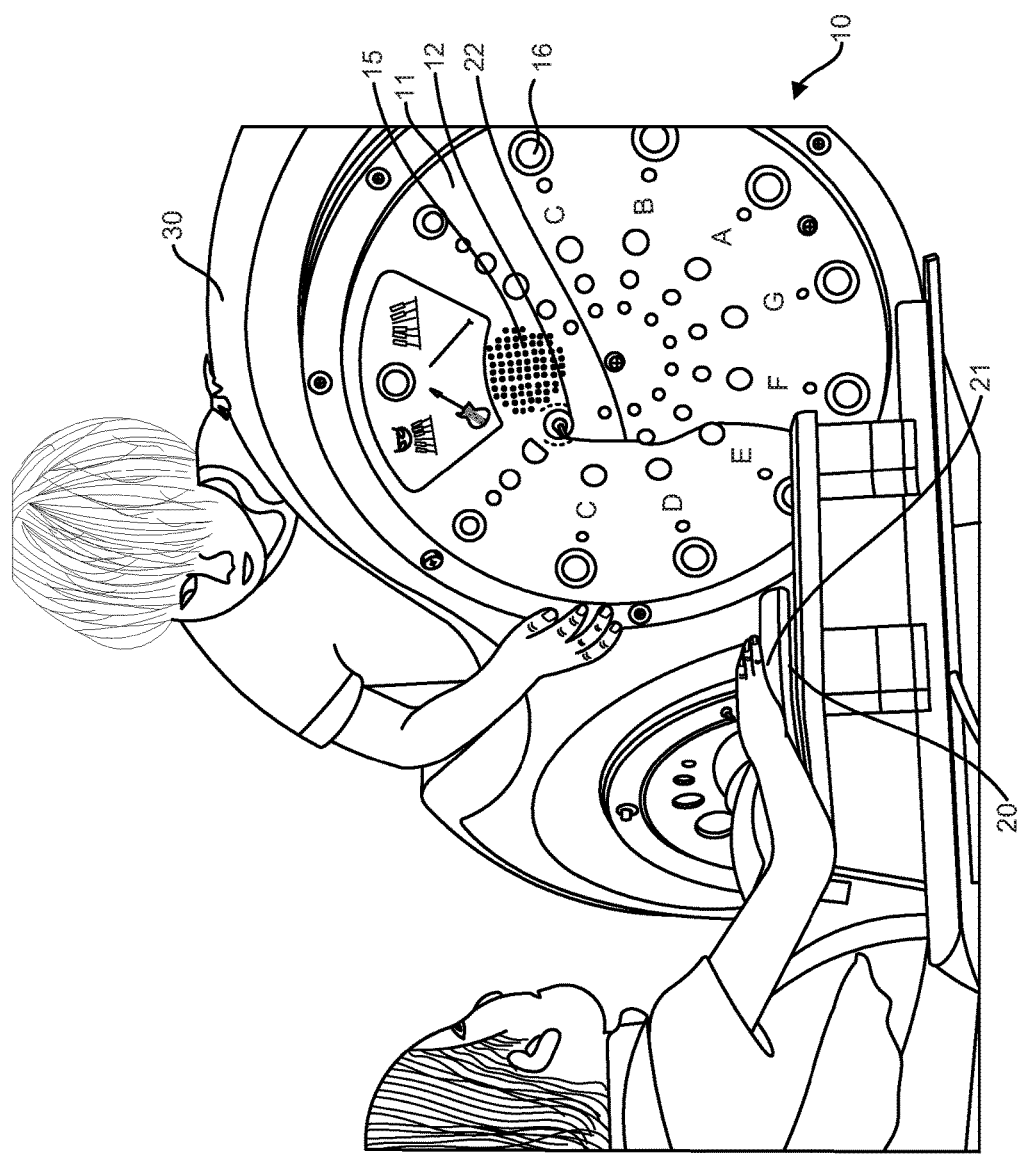
FIG. 1 is a perspective view of an embodiment of an interactive play panel of the present disclosure, having an adaptive switch connected thereto.

An embodiment of a play panel 10 in accordance with the present description is shown in FIG. 1. The play panel 10 comprises a surface 11 that is configured to provide one or more interactive play elements. In the illustrated embodiment, the play panel 10 comprises a circular, or round, surface 11. In other embodiments, however, the surface 11 may take on any other desired shape. For instance, in some embodiments, the surface 11 may be polygonal, rectangular, triangular, or the like. In some embodiments, the surface 11 may take on a novelty shape that may relate to a theme of the play panel 10 or the theme of the playground structure in which it is incorporated.

In some embodiments, the play panel 10 may have multiple surfaces 11 that are configured to provide interactive play elements. For instance, some play panels 10 may be double-sided, with each of two opposing sides providing a surface 11 comprising one or more interactive play elements. In some embodiments, each side of the play panel 10 may be configured to be operated by a control unit, such as described herein. In other embodiments, only one side of the play panel 10 may be configured to be operated by a control unit, such as described herein. For instance, a first side of the play panel 10 may be configured to be operated by a control unit as described herein, while a second side of the play panel may provide a conventional play activity.

The play panel 10 also comprises a connection element that is configured for providing a communicative link between an adaptive switch and play panel, more particularly to provide a communicative link between an adaptive switch 20 and the control unit of the play panel. For example, the play panel 10 embodiments illustrated in the Figures include an adaptive switch port 12. In other embodiments, however, the connection element may comprise a wireless communication device that may be communicatively linked with an adaptive switch 20 using any of a variety of wireless technology, e.g. Bluetooth and the like. In some embodiments, the play panel 10 may comprise both an adaptive switch port 12 and a wireless communication device that is configured to link with an adaptive switch 20 wirelessly.

An adaptive switch 20 is a unit that allows for a child having a disability to activate devices and other technology in their environment. Adaptive switches comprise a control element 21, such as a button, knob, joystick, etc., and a connection element 22, such as a plug, e.g. a conventional mono or stereo plug. It is also contemplated that in some instances the connection element 22 of the adaptive switch may comprise a wireless technology, such as Bluetooth and the like. When the adaptive switch 20 is connected to a device that is configured to work with the adaptive switch, a user may communicate with and operate the device using the control element 21. In many instances, the control element 21 may be mounted on a mobility device that is utilized by a child having a disability.

In some embodiments, the adaptive switch port 12 on the play panel 10 may be configured for connection with a plug element 22 of an adaptive switch, so as to allow for the transmission of a signal from the adaptive switch 12 to the play panel 10 (and more specifically to the control unit of the play panel). For example, as illustrated in FIG. 1, an adaptive switch 20 comprising a button 21 that is mounted onto a child's mobility device may be connected to the play panel 10 by inserting the connection element 22, here a conventional 3.5 mm mono plug, into the adaptive switch port 12. An example of the connection between the adaptive switch connection element 22 and the adaptive switch port 12 of the play panel is shown in detail in FIG. 2.

Figure 2:
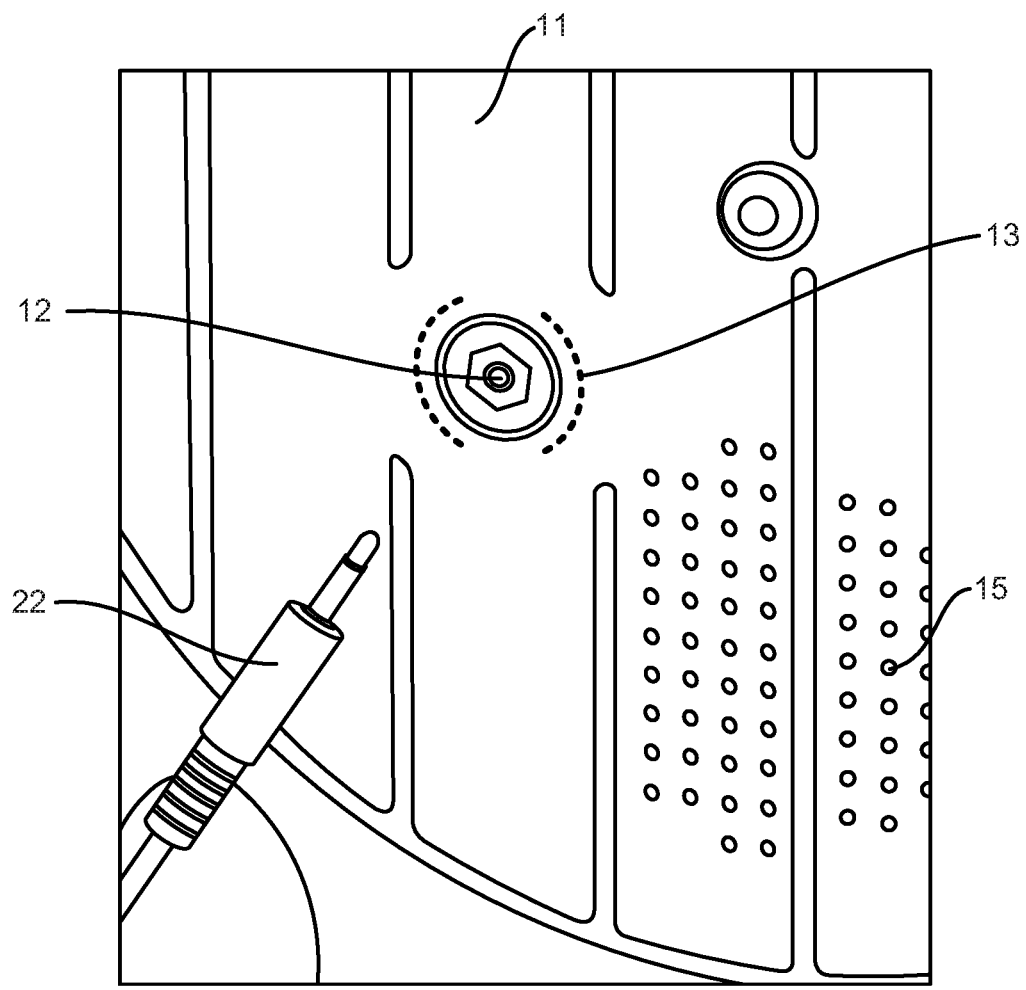
FIG. 2 is a perspective view of a portion of an interactive play panel of the present disclosure, showing a clearly identified adaptive switch port.

As shown in FIGS. 1 and 2, the adaptive switch port 12 may be located on the surface 11 that is configured to provide one or more interactive play elements for a child. In this way, one may easily identify the play panel 10 as being configured to operate with an adaptive switch 20. For instance, in some embodiments, the adaptor switch port 12 may be identified on the surface 11, such as by the inclusion of an identifying graphic 13 on the surface. An example of such a graphic 13 is shown in FIG. 2. As illustrated, the graphic 13 may surround the adaptive switch port 12. In other embodiments, an identifying graphic 13 may be located elsewhere on the surface 11 of the play panel.

In other embodiments, the adaptive switch port 12 may be located elsewhere on the play panel 10, i.e. not on the surface 11 comprising the interactive play elements. In some embodiments, the play panel 10 may be configured to link up wirelessly with an adaptive switch 20, such that no physical connection is required. Accordingly, in some embodiments, the play panel 10 may be designed for wireless operation with an adaptive switch 20 either in place of or in addition to operation with an adaptive switch that is physically connected to the play panel.

The play panel 10 also comprises a control unit 14. The control unit 14 may also be referred to as a processing unit or a processor. The control unit 14 may comprise a conventional printed circuit board (PCB) that is configured to receive an input signal from one or more sources and convert that input signal into one or more output signals. The control unit 14 is desirably protected from the playground environment. For instance, the control unit 14 may preferably be located behind the surface 11 comprising the play activity, such that it is not visible to children when interacting with the play panel 10. The control unit 14 may, for example, be positioned within an interior of the play panel 10, e.g. between the front and rear surfaces of the play panel. In some embodiments, such as where a play panel 10 may have multiple surfaces 11 that are configured to provide play activities as described above, a single control unit 14 may be configured to operate the multiple play activities. This may reduce the costs associated with each play activity. Alternatively, each play activity may be operated by its own control unit 14. The play panel 10 may also comprise a power source for the control unit 14, such as one or more battery packs.

Depending on the type of play activity (or activities) provided by the play panel 10, the play panel may comprise a number of output components that may be linked with the control unit 14. In some embodiments, for example, the play panel 10 may comprise one or more speakers 15. In the play panel 10 illustrated in FIG. 1, for example, the surface 11 comprising the interactive play elements has a visible speaker 15. In other embodiments, the one or more speakers 15 may not be visible on the surface 11 of the play panel. In some embodiments, the play panel 10 may comprise one or more lights on, or attached to, the surface 11 of the play panel. In some embodiments, the play panel 10 may comprise one or more physical elements on, or attached to, the surface 11 of the play panel and one or more motors that are configured to manipulate the one or more physical elements. In some embodiments, the play panel 10 may comprise one or more video screens on, or attached to, the surface 11 of the play panel. Embodiments of the play panel 10 may also comprise any combination of control unit output components, such as combinations of speakers, lights, motors, and video screens.

The play panel 10, and in particular the surface 11, may also include any number of additional play elements. For example, the surface 11 of the play panel 10 may comprise any number of auditory play elements, visual play elements, tactile or physical play elements, or combinations thereof. For example, the surface 11 may comprise one or more elements, either on or attached to the surface, that are configured to be physically manipulated by a child. For instance, the surface 11 of a play panel may have one or more elements that are configured to be rotated, spun, pressed, pulled, or otherwise physically moved by a child. Physical manipulation of elements on the surface 11 of the play panel 10 may result in auditory feedback and/or stimulation, visual feedback and/or stimulation, tactile feedback and/or stimulation, or combinations thereof.

The play panels 10 of the present disclosure are configured to have multiple manners of operation. For instance, the play panels 10 may be operated through the interaction of a child with one or more interactive elements on the surface 11 of the panel. For example, physical manipulation of an element on the surface 11 of the panel may cause a signal to be sent to the control unit 14. The control unit 14 may process that input signal and send an output signal to one or more output components such as a speaker, a light, a motor, a video screen, or the like.

For instance, in the embodiment shown in FIG. 1 (and FIGS. 3A and 3B), a child may touch any of a number of sensors that are configured to detect a person's touch, in this case buttons 16, located on the surface 11 of the play panel. The pressing of one of the buttons 16 sends a signal to the control unit 14, which then processes that input signal and sends an output signal to the speaker 15, the output signal corresponding with a musical note (or a series of musical notes). By pressing the buttons 16 in a series, a child may thereby cause a song or a portion of a song to play over the speaker 15. While the illustrated embodiment shows buttons 16, other interactive elements are also contemplated, including for example touch sensors, motion sensors, and the like.

The play panels 10 may also be operated through the interaction of a child with an adaptive switch 20. For instance, an adaptive switch 20 may be connected to the play panel 10, such as through the adaptive switch port 12 on the play panel. Once the adaptive switch 20 is connected to the play panel 10, the play panel may be operated through the interaction of a child having a disability with the control element, e.g. button 21, of the adaptive switch. For example, physical manipulation the control element 21 of the adaptive switch 20 may cause a signal to be sent to the control unit 14. The control unit 14 may process that input signal and send an output signal to one or more play element such as a speaker, a light, a motor, a video screen, or the like. In some embodiments, the control unit 14 may recognize the input as being sent by an adaptive switch 20 and may present a different output signal based on that recognition.

For instance, in the embodiment shown in FIG. 1 (and FIGS. 3A and 3B), a child may press the button 21 element of the adaptive switch 20. The pressing of the button 21 sends a signal to the control unit 14, which then processes that input signal and sends an output signal to the speaker 15. However, rather than emitting a single musical note, as is the case when a child interacts directly with the surface 11 of the play panel 10, the output signal may cause the speaker 15 to emit a song or a portion of a song.

In some embodiments, the control unit 14 may be configured to recognize whether the input signal was caused by a child activating one or more interactive elements on the surface 11 of the play panel 10 or by a child activating an adaptive switch 20 that is connected to the adaptive switch port 12 of the play panel. The control unit 14 may be configured to operate in a first mode when actuated by the one or more interactive elements on the surface 11 of the play panel 10 and to operate in a second mode when actuated by the adaptive switch. As described above with respect to the embodiment shown in FIG. 1, the output signal sent by the control unit may be different in the first mode than the output signal sent by the control unit in the second mode. In this way, the play panel 10 may provide a play activity that is tailored for enjoyment by a child having a disability when operated in the second mode, while at the same time providing a play activity that is tailored for enjoyment by children without disabilities when operated in the first mode.

In other embodiments, the output signal sent by the control unit may be the same in the first mode and the second mode. For instance, the control unit 14 may be configured to provide the same output signal (and hence substantially the same play activity) whether actuated by one or more interactive elements on the surface of the panel or by an adaptive switch 20 that is connected to the adaptive switch port 12. In the embodiment of a play panel 10 shown in FIGS. 5A and 5B, for example, a child may touch a touch sensor 17 located on the surface 11 of the play panel to actuate the control unit 14 to send an output signal to the speaker 15 that causes a wave or ocean sound to issue from the speaker. In much the same way, a child having a disability may activate an adaptive switch 20 to actuate the control unit 14 to send an output signal to the speaker 15 that causes a wave or ocean sound to issue from the speaker. In this way, the play panel 10 may provide a play activity that may be enjoyed by children with disabilities and children without disabilities alike.

In some embodiments, the play panel 10 may be configured so that both manners of operation may be performed together. For example, when an adaptive switch 20 is connected to the play panel 10, a child may still operate the play panel through interaction with one or more elements on the surface 11 of the panel (while a child having a disability may operate the play panel through activation of the adaptive switch). In other embodiments, however, the play panel 10 may be configured so that activation of the one or more interactive elements on the surface 11 of the play panel does not cause the control unit 14 to issue the output signal when the play activity is in use through interaction of a child with a connected adaptive switch 20. This limiting of the response to interaction with the surface 11 of the play panel may take on any of a number of varying degrees.

In some embodiments, for instance, the control unit 14 may be configured so that operation in the first mode—i.e. operation brought on through the interactive element(s) on the surface 11 of the play panel 10—is temporarily unavailable during operation in the second mode—i.e. operation brought on through a connected adaptive switch 20. For example, in the embodiment of the play panel 10 shown in FIG. 1 (and FIGS. 3A and 3B), pressing of the buttons 16 on the surface 11 of the play panel may have no effect while a song or portion of a song is being played in response to activation of a connected adaptive switch 20. This would allow for the play activity to alternately be activated in each of the two modes, but would not allow for operation in either one mode to override an existing operation. Alternatively, the play panel 10 may be configured so that pressing of the buttons 16 on the surface 11 of the play panel may have no effect at any time after an adaptive switch 20 is connected to the adaptive switch port 12 of the play panel. For instance, the control unit 14 may limit the play activity to operation in the second mode—i.e. operation brought on through a connected adaptive switch 20—when an adaptive switch is connected to the adaptive switch port 12 of the play panel 10.

Figure 3A:
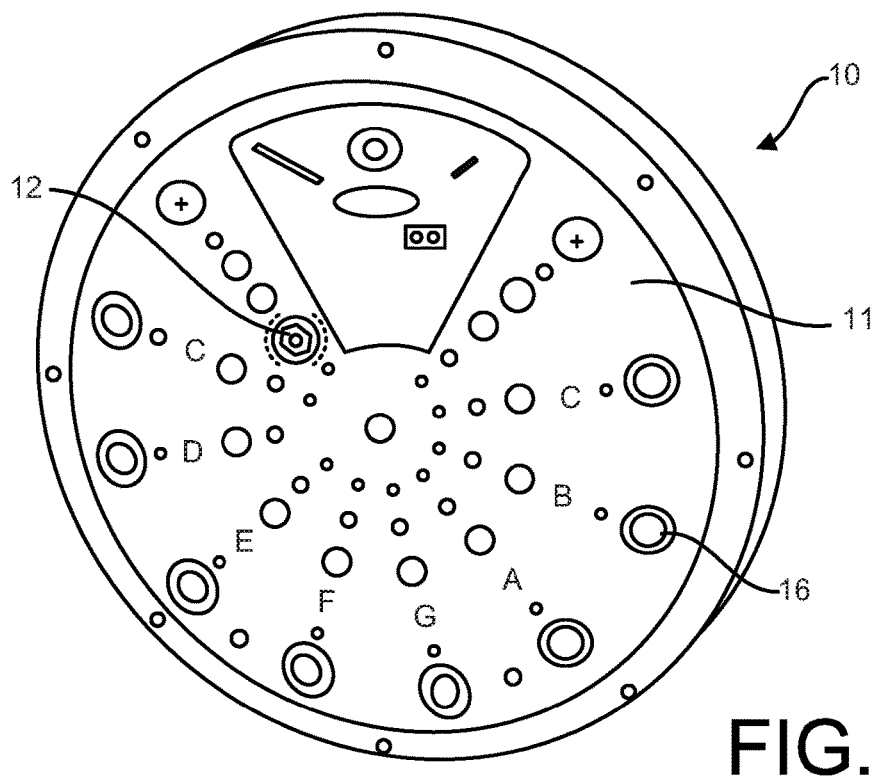
FIG. 3A is a front view of an embodiment of an interactive play panel of the present disclosure that provides an auditory play activity.
Figure 3B:
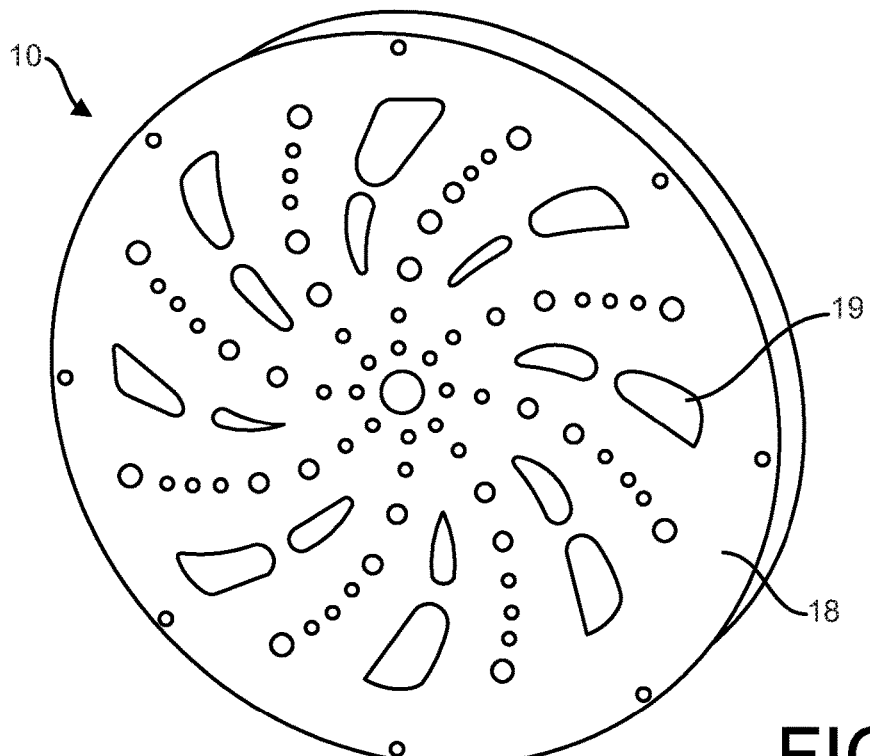
FIG. 3B is a rear view of the embodiment of an interactive play panel illustrated in FIG. 3A.
Figure 4A:
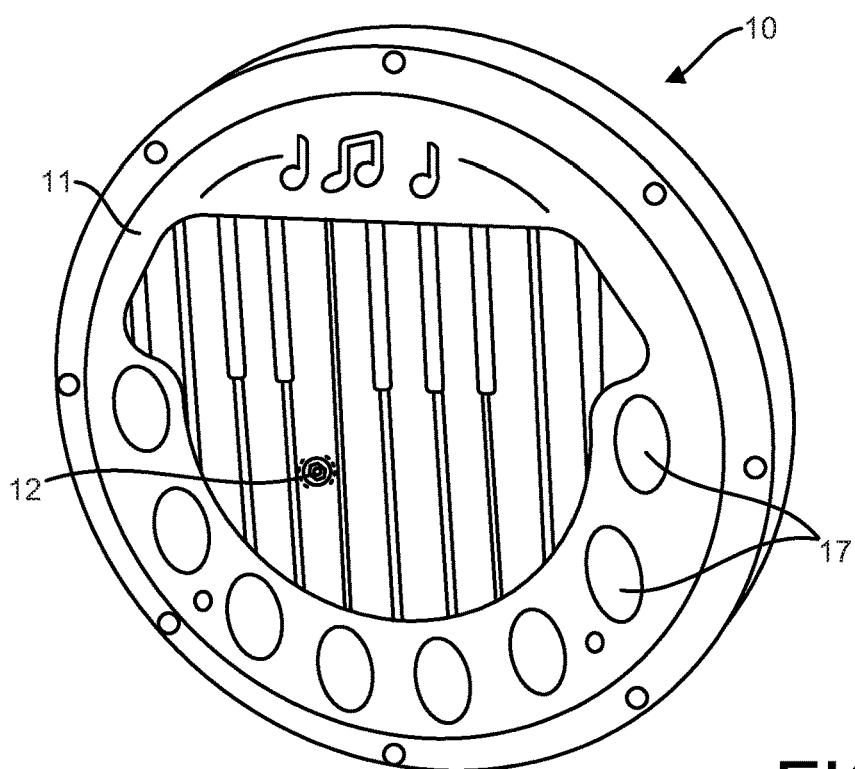
FIG. 4A is a front view of an embodiment of an interactive play panel of the present disclosure that provides an auditory play activity.
Figure 4B:
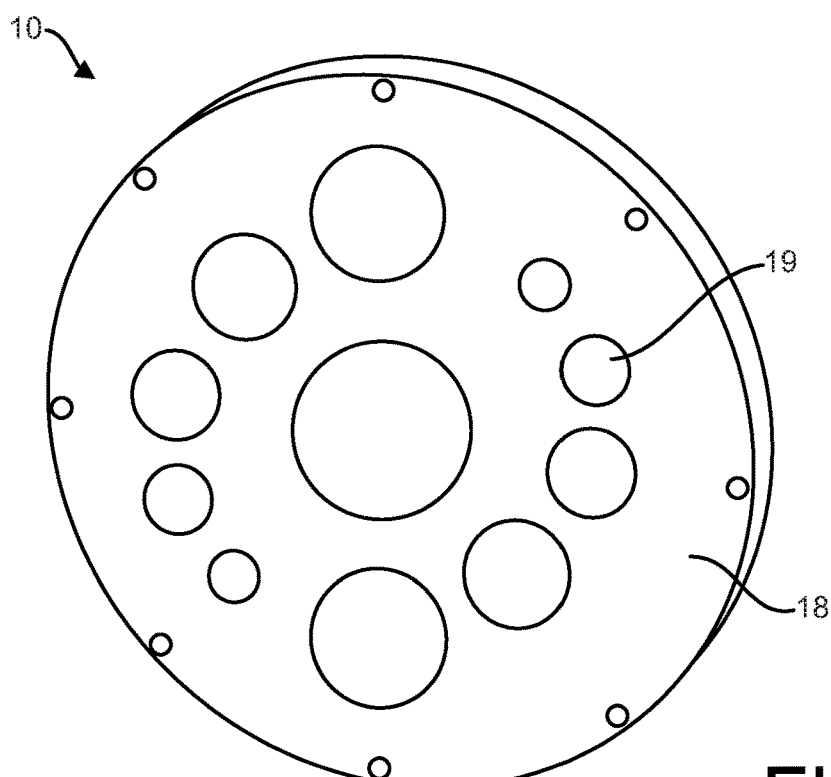
FIG. 4B is a rear view of the embodiment of an interactive play panel illustrated in FIG. 3A.
Figure 5A:
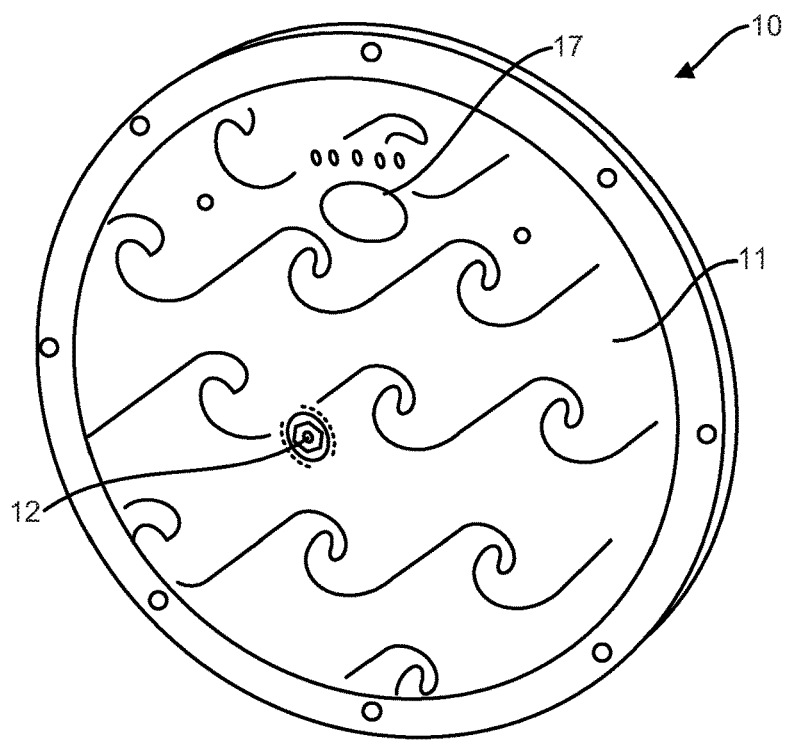
FIG. 5A is a front view of an embodiment of an interactive play panel of the present disclosure that provides an auditory play activity.
Figure 5B:
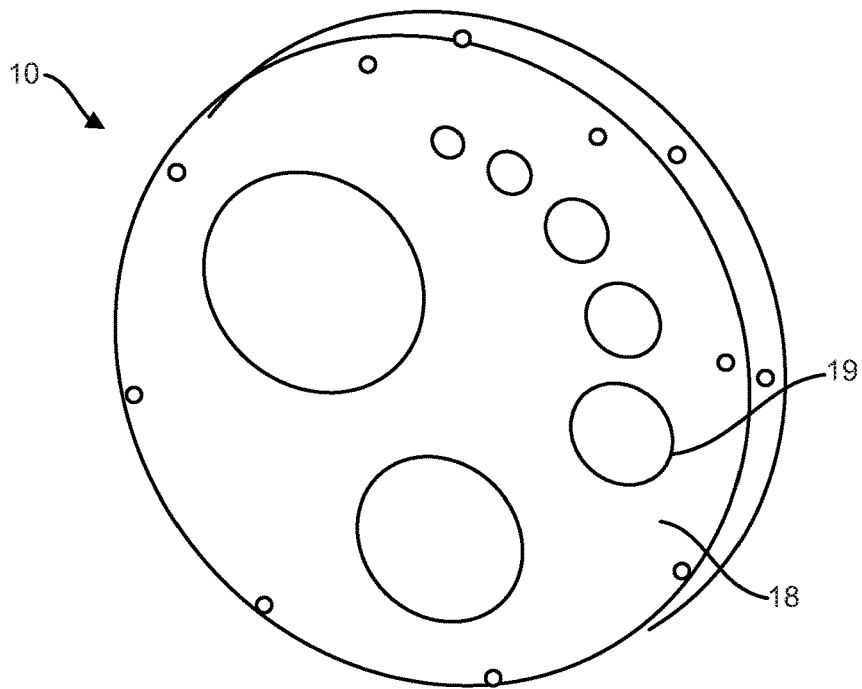
FIG. 5B is a rear view of the embodiment of an interactive play panel illustrated in FIG. 3A.

As described above with respect to the embodiment shown in FIGS. 3A and 3B and the embodiment shown in FIGS. 5A and 5B, the play panel 10 may be configured to provide an auditory play activity. Another embodiment of a play panel 10 configured to provide an auditory play activity is shown in FIGS. 4A and 4B. In this embodiment, the surface 11 of the play panel 10 comprises a plurality of touch sensors 17, each of which causes a musical note to issue from a speaker. In this manner, a child may play a song by touching the sensors 17 in a defined sequence. When an adaptive switch 20 is connected with the adaptive switch port 12, a child with a disability may cause musical notes, sequences of musical notes, portions of a song, or songs to issue from a speaker by activating the adaptive switch.

In some embodiments, the play panel 10 may comprise a plurality of adaptive switch ports 12. Each of the plurality of adaptive switch ports 12 may be configured to produce a different output signal. In this way, a child or caretaker could take part in a play activity with a child having a disability by plugging an adaptive switch 20 into the various adaptive switch ports 12 so that a child having a disability may activate the adaptive switch to produce a variety of different output signals. For instance, although not illustrated, in the embodiment shown in FIG. 4, the play panel 10 could comprise a plurality of adaptive switch ports 12, with the control panel 14 being configured so that activation of an adaptive switch 20 that is connected with a particular port produces a musical note or a series of musical notes to issue from the speaker. The adaptive switch 20 could thus be moved between the various adaptive switch ports 12 and activated in a sequence in order to produce a song or a portion of a song.

The embodiments of play panels 10 shown in FIGS. 3-5 all may be utilized as double-sided play panels. The first side 11 of each of the play panels 10, shown in FIGS. 3A, 4A, and 5A, is configured to be operated by a control unit to provide an auditory play activity as described herein, while the second side of each of the play panels, shown in FIGS. 3B, 4B, and 5B, provides a conventional play activity. In the examples shown in the Figures, the second side of each of the play panels provides a visual and/or tactile play activity. For instance, the second sides of the play panels 10 may comprise an upper surface 18 that is be physically rotatable relative to the rest of the play panel 10. The upper surface 18 may comprise openings of various sizes and configurations that reveal various portions of a lower surface 19 during rotation. Any of a variety of play activities (including those utilizing a control unit 14 and an adaptive switch port 12) are also contemplated for the second side of the play panels 10 shown in the illustrated embodiments. Alternatively, any of the illustrated play panels 10 may be a one-sided, with the rear of the play panel being configured to be concealed by the playground structure to which it is mounted.

While the illustrated embodiments all provide auditory play activities, the technology described herein may also be used to prepare play panels 10 that provide visual play activities. For example, in some embodiments, the play panel 10 may comprise one or more lights on the play surface 11. The play panel 10 may be configured so that a child may touch one or more interactive elements, e.g. touch sensors such as buttons or the like, on the surface 11 of the play panel 10 in order to trigger the control unit 14 to illuminate the one or more lights. The play panel 10 may also be configured so that a child may trigger the control unit 14 to illuminate the one or more lights by activating the adaptive switch 20. The illumination of the light(s) that occurs when the adaptive switch 20 is activated (e.g. during operation of the control panel 14 in the second mode) may be the same as, or different from, the illumination of the light(s) that occurs when the one or more interactive elements on the surface 11 of the play panel 10 are activated (e.g. during operation of the control panel in the first mode).

Similarly, the technology described herein may also be used to prepare play panels 10 that provide physical play activities. For instance, the play panel 10 may comprise one or more elements that are movable about the surface 11 of the play panel. The play panel 10 may be configured so that a child may (i) physically manipulate the element(s) and/or (ii) touch one or more interactive elements, e.g. touch sensors such as buttons or the like, on the surface 11 of the play panel in order to trigger the control unit 14 to initiate a motor that manipulates the element(s). The play panel 10 may also be configured so that a child may trigger the control unit 14 to initiate a motor that manipulates the element(s) by activating the adaptive switch 20. The manipulation of the element(s) that occurs when the adaptive switch 20 is activated (e.g. during operation of the control unit 14 in the second mode) may be the same as, or different from, the manipulation of the element(s) that occurs when the one or more interactive elements on the surface 11 of the play panel 10 are activated (e.g. during operation of the control unit in the first mode).

Similarly, the technology described herein may also be used to prepare play panels 10 that provide video play activities. For instance, the play panel 10 may comprise one or more video screens on the surface 11 of the play panel. The play panel 10 may be configured so that a child may touch one or more interactive elements, e.g. touch sensors or a touchscreen, on the surface 11 of the play panel in order to trigger the control unit 14 to play content on the video screen, alter/change the content being played on the video screen, or the like. The play panel 10 may also be configured so that a child may trigger the control unit 14 to play content on the video screens, alter/change the content being played on the video screen, or the like, by activating an adaptive switch 20. The video content that is played when the adaptive switch 20 is activated (e.g. during operation in the second mode) may be the same as, or different from, the video content that is played when the one or more interactive elements on the surface 11 of the play panel 10 are activated (e.g. during operation in the first mode).

The play panels 10 of various embodiments, as described herein, are configured to be mounted on various playground structures 30. The mounting may be achieved in any of a number of conventional manners. In some embodiments, for example, the play panel 10 comprises a number of through-holes through which fasteners—such as bolts—may be inserted to secure the play panel to a playground structure 30. These through-holes may be provided around the periphery of the play panels 10. The number of through-holes may vary depending on the size, shape, and/or weight of the play panel 10.

Embodiments of the present disclosure are also directed to playground structures 30 comprising the multi-operation play panels 10 described herein. The multi-operation play panels 10 may be incorporated into a variety of playground structures 30 to increase the play opportunities provided by each of the structures.

Figure 6:
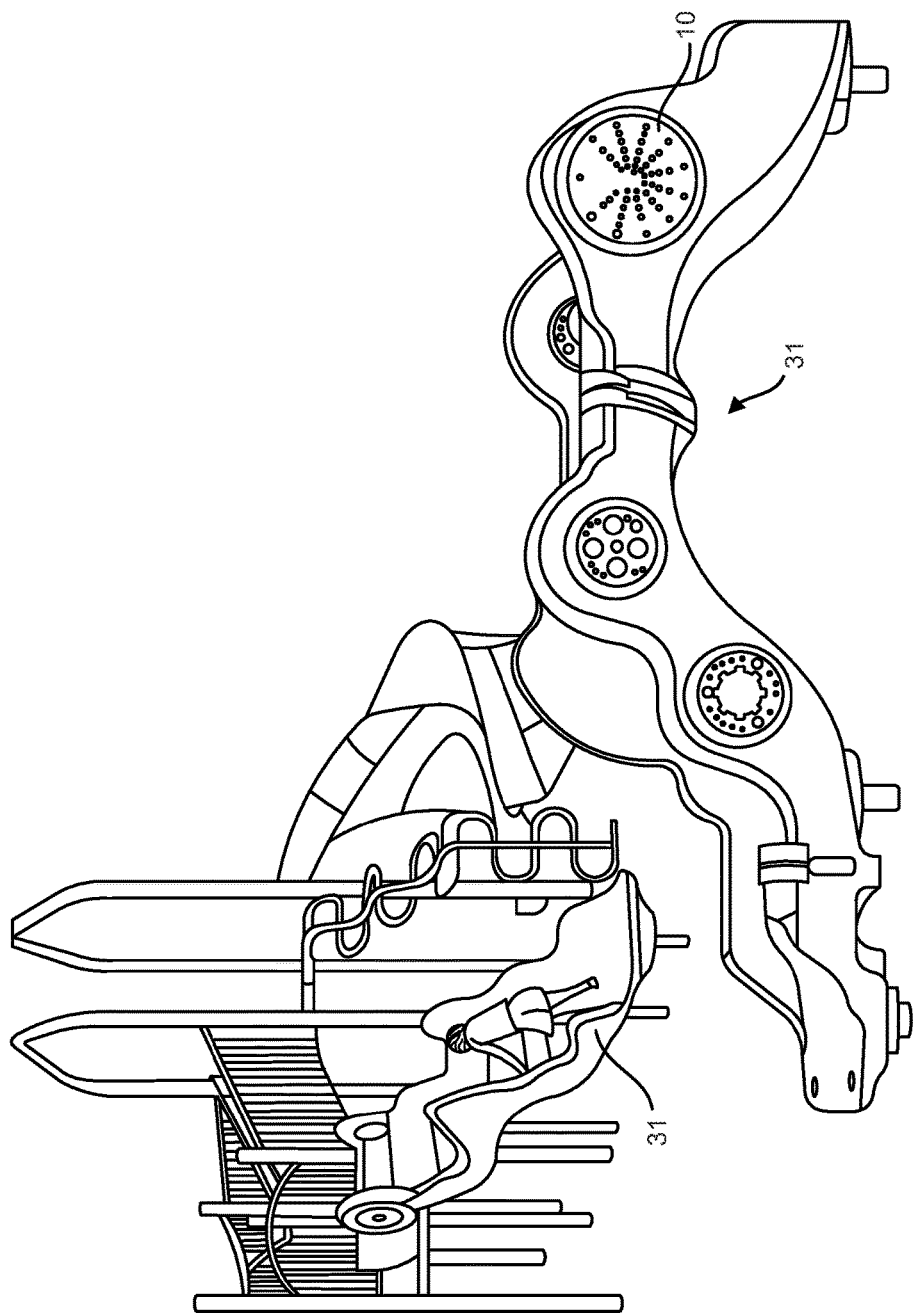
FIG. 6 is an illustration of embodiments of climber units comprising the interactive play panels of the present disclosure.

For example, embodiments of the multi-operation play panels 10 described herein may be mounted to a climber unit 31, such as either of the climber units shown in FIG. 6. In some embodiments, the play panel 10 may be mounted to the climber unit 31 so that the multi-operation play activity is accessible on the exterior of the climber unit. For instance, the play panel 10 shown in FIGS. 3A and 3B is mounted on one of the climber units 31 shown in FIG. 6 so as to be accessible on the exterior of the unit. In other embodiments, the play panel 10 may be mounted to the climber unit 31 so that the multi-operation play activity is accessible on the interior of the climber unit 31. Moreover, in some embodiments, a climber unit 31 such as that shown in FIG. 6 may have a plurality of multi-operation play panels 10 mounted to the climber unit so that multi-operation play panels are accessible on both the interior and the exterior of the climber unit. A climber unit 31 may comprise any number of multi-operation play panels 10 mounted thereon.

Figure 7:
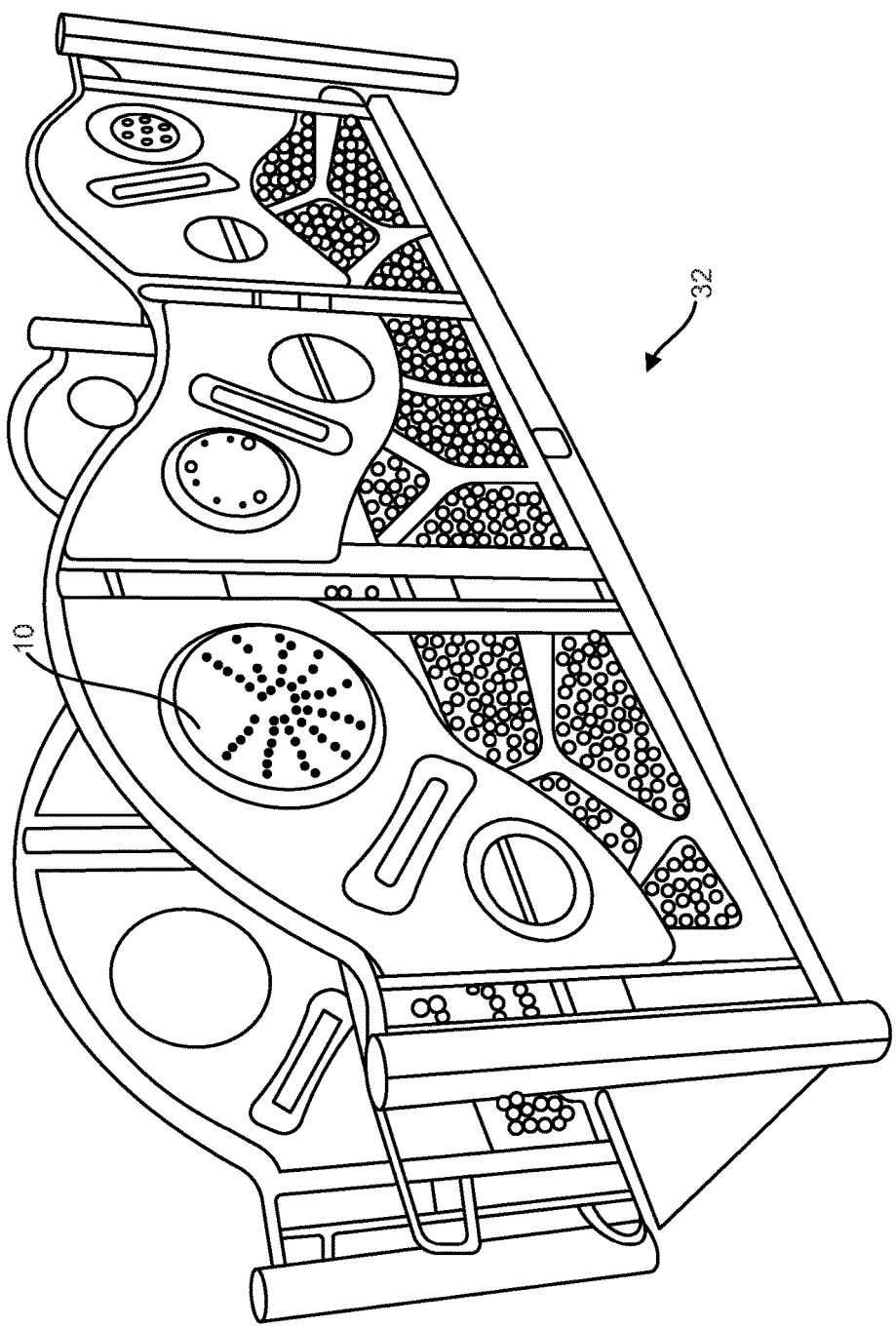
FIG. 7 is an illustration of an embodiment of a ramp unit comprising the interactive play panels of the present disclosure.

Embodiments of the multi-operation play panels 10 described herein may also be mounted to walkways, bridges, ramps, and the like, which are utilized in playground structures 30. For example, an example of a playground structure 32 that may serve as a walkway, a bridge, or a ramp is shown in FIG. 7. In some embodiments, the play panel 10 may be mounted to the playground structure 32 so that the multi-operation play activity is accessible on the exterior of the playground structure 32. For instance, the play panel 10 shown in FIGS. 3A and 3B is mounted on the playground structure 32 shown in FIG. 7 so as to be accessible on the exterior of the unit. In other embodiments, the play panel 10 may be mounted to the playground structure 32 so that the multi-operation play activity is accessible on the interior of the playground structure 32. Moreover, in some embodiments, a playground structure 32 such as that shown in FIG. 7 may have a plurality of multi-operation play panels 10 mounted to the playground structure 32 so that multi-operation play panels are accessible on both the interior and the exterior of the playground structure 32. A playground structure 32 may comprise any number of multi-operation play panels 10 mounted thereon.

Embodiments of the multi-operation play panels 10 described herein may also be mounted to existing walls of playground structures or to walls that are specifically configured to display one or more play panels. For instance, the play panels 10 may be mounted on the protective walls of elevated playground structures 30. Alternatively, the play panels 10 may be mounted on walls that either provide a stand-alone play structure or that are attached to existing playground structures to provide additional play opportunities.

In some embodiments, the playground structure 30 containing one or more multi-operation play panels 10 may be configured to allow a child standing on the structure 30 to interact with the surface 11 of a play panel 10 at the same time that a child in a mobility device may interact with the play panel from the ground, providing beneficial cooperative play opportunities. An example of such an arrangement is shown in FIG. 1. Further, in some embodiments, the playground structure 30 containing one or more multi-operation play panels 10 may be configured to allow a child in a mobility device to easily reach the surface 11 of the play panel, such as by providing open space underneath the play panel that may accept a portion of a mobility device beneath the panel. An example of such an arrangement is shown in FIG. 6.

It can be seen that the described embodiments provide unique and novel play panels 10 and playground structures 30 that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An inclusive-play playground assembly comprising:
a playground structure comprising one or more interactive play panels, at least one of the one or more play panels comprising:
a surface comprising one or more interactive elements;
a control unit configured to operate a play activity; and
a connection element configured for communicatively linking an adaptive switch with the control unit;
wherein the control unit may be actuated to operate a play activity by:
(a) the one or more interactive elements on the surface of the play panel, and
(b) an adaptive switch that is communicatively linked with the control unit.

2. The playground assembly of claim 1, wherein
the control unit is configured to operate in a first mode when actuated by the one or more interactive elements on the surface of the play panel, and
the control unit is configured to operate in a second mode when actuated by an adaptive switch that is communicatively linked with the control unit.

3. The playground assembly of claim 2, wherein the play activity when operated in the second mode differs from the play activity when operated in the first mode.

4. The playground assembly of claim 2, wherein the control unit is configured so that operation in the first mode is at least temporarily unavailable during operation in the second mode.

5. The playground assembly of claim 4, wherein the control unit limits the play activity to operation in the second mode when an adaptive switch is communicatively linked with the control unit.

6. The playground assembly of claim 1, wherein the interactive elements comprise one or more sensors that detect a child's touch.

7. The playground assembly of claim 1, wherein the connection element is an adaptive switch port.

8. The playground assembly of claim 7, wherein the adaptive switch port is located on the surface comprising one or more interactive elements.

9. The playground assembly of claim 1, wherein the connection element is a wireless communication device.

10. The playground assembly of claim 1, the play panel further comprising one or more speakers.

11. The playground assembly of claim 10, wherein activating the adaptive switch causes a song or a portion of a song to play over the one or more speakers.

12. The playground assembly of claim 11, wherein the surface comprises a plurality of sensors that detect a child's touch and each of the plurality of sensors may be touched to play a musical note or a series of musical notes over the one or more speakers.

13. The playground assembly of claim 10, wherein activating the adaptive switch causes one or more sounds to issue from the one or more speakers.

14. The playground assembly of claim 1, the play panel further comprising one or more lights on the surface comprising one or more interactive elements.

15. The playground assembly of claim 14, wherein activation of the adaptive switch causes one or more of the lights to be illuminated.

16. The playground assembly of claim 1, further comprising one or more motors that physically manipulate one or more interactive elements on the surface.

17. The playground assembly of claim 16, wherein activating the adaptive switch actuates the one or more motors.

18. The playground assembly of claim 1, the play panel further comprising a video screen on the surface comprising one or more interactive elements.

19. The playground assembly of claim 18, wherein activating the adaptive switch causes content to be shown on the video screen, changes the content shown on the video screen, or a combination thereof.

20. The playground assembly of claim 1, wherein the playground structure is a climber unit, a walkway, a ramp, or a bridge.

* * * * *